United States Patent
Senevirathne et al.

(10) Patent No.: US 7,062,568 B1
(45) Date of Patent: Jun. 13, 2006

(54) POINT-TO-POINT PROTOCOL FLOW CONTROL EXTENSION

(75) Inventors: Tissa Senevirathne, Sunnyvale, CA (US); Somsubhra Sikdar, San Jose, CA (US)

(73) Assignee: Forcelo Networks, Inc., Milpitas, CA (US)

(*) Notice: Subject to any disclaimer, the term of this patent is extended or adjusted under 35 U.S.C. 154(b) by 793 days.

(21) Appl. No.: 10/061,916

(22) Filed: Jan. 31, 2002

(51) Int. Cl.
*G06F 15/16* (2006.01)
*H04J 3/14* (2006.01)

(52) U.S. Cl. .................. 709/234; 370/229; 370/231

(58) Field of Classification Search ............... 709/230, 709/231, 232, 233, 234, 235; 370/230.1, 370/231, 232, 234
See application file for complete search history.

(56) References Cited

U.S. PATENT DOCUMENTS

| | | | |
|---|---|---|---|
| 5,805,577 A * | 9/1998 | Jain et al. | 370/234 |
| 5,815,492 A * | 9/1998 | Berthaud et al. | 370/234 |
| 6,208,640 B1 * | 3/2001 | Spell et al. | 370/358 |
| 6,512,754 B1 * | 1/2003 | Feder et al. | 370/338 |
| 6,560,243 B1 * | 5/2003 | Mogul | 370/468 |
| 6,640,248 B1 * | 10/2003 | Jorgensen | 709/226 |
| 6,741,563 B1 * | 5/2004 | Packer | 370/231 |
| 6,772,245 B1 * | 8/2004 | Pomerantz et al. | 710/60 |
| 6,778,495 B1 * | 8/2004 | Blair | 370/230 |
| 6,862,618 B1 * | 3/2005 | Gray et al. | 709/224 |
| 6,894,974 B1 * | 5/2005 | Aweya et al. | 370/230.1 |
| 2002/0055998 A1 * | 5/2002 | Riddle et al. | 709/224 |
| 2003/0007504 A1 * | 1/2003 | Berry et al. | 370/465 |

OTHER PUBLICATIONS

Ndousse, T.D.; Kumar, S.P.R.; "PPP extensions for IP/PPP-HDLC over SONET-SDH/WDM" Communications, 1999. ICC '99. 1999 IEEE International Conference on vol. 1, Jun. 6-10, 1999 Page(s):575-580 vol. 1.*

Phanse, K.S.; DaSilva, L.A.; Kidambi, K.; "Characterization of performance of TCP/IP over PPP and ATM over asymmetric links" Computer Communications and Networks, 2000. Proceedings. Ninth Inernational Conference on Oct. 16-18, 2000 Page(s):334-339.*

(Continued)

*Primary Examiner*—John Follansbee
*Assistant Examiner*—Kenny Lin
(74) *Attorney, Agent, or Firm*—Haynes and Boone, LLP

(57) ABSTRACT

Method and apparatus are disclosed for flow control over Point-to-Point Protocol (PPP) data links. A method of negotiating such flow control between two PPP peers is disclosed, along with methods for operating flow control across a PPP link. In one embodiment, flow control frames carry an IEEE802.3x MAC control frame payload—the PPP implementation repackages such frames as MAC control frames and passes them to a MAC, which performs flow control. In another embodiment, flow control frames allow flow control commands to be applied differently to different service classes such that PPP flow can be controlled on a per-class basis.

10 Claims, 11 Drawing Sheets

OTHER PUBLICATIONS

D. Perkins, Internet Engineering Task Force (IETF) Request for Comments (RFC) 1547, "Requirements for an Internet Standard Point-to-Point Protocol" ( Dec. 1993), printed on Jan. 9, 2002 from website located at http://theory.cs.uni-bonn.de/ppp/rfc/rfc1547.txt, pp. 1-20.

W. Simpson, IETF RFC 1619, "PPP Over SONET/SDH" (May 1994), printed on Jan. 11, 2002 from a website located at http://www.ietf.org/rfc/rfc1619.txt?number=1619, pp. 1-6.

W. Simpson, IETF RFC 1661, "The Point-to-Point Protocol (PPP)" (Jul. 1994), printed on Apr. 30, 2002 from a website located at http://www.ietf.cnri.reston.va.us/rfc/rfc1661.txt?number=1661, pp. 1-50.

W. Simpson, IETF RFC 1662, "PPP in HDLC-like Framing" (Jul. 1994), printed on Apr. 30, 2002 from a website located at http://www.ietf.cnri.reston.va.us/rfc/rfc1662.txt?number=1662, pp. 1-24.

A. Malis, IETF RFC 2615, "PPP over SONET/SDH" (Jun. 1999), printed on Jan. 11, 2002 from a website located at http://www.ietf.org/rfc/rfc2615.txt?number=2615, pp. 1-8.

Cisco Systems, Inc., "Point-to-Point Protocol", printed on Jul. 23, 2001 from a website located at http://cisco.com/univercd/cc/td/doc/cisintwk/ito_doc/ppp.htm, pp. 1-4.

* cited by examiner

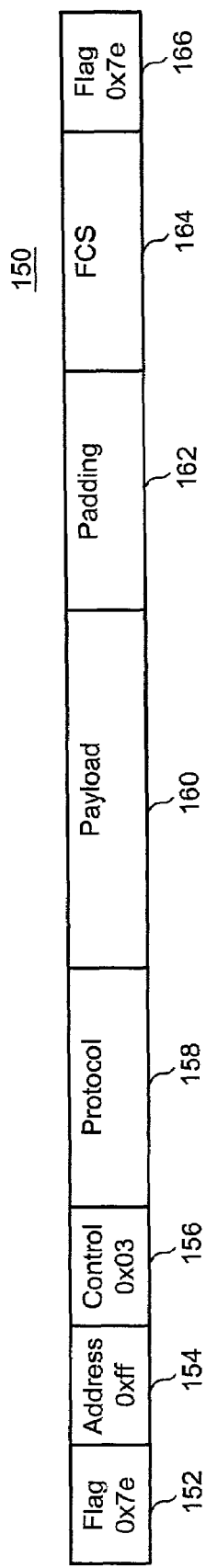
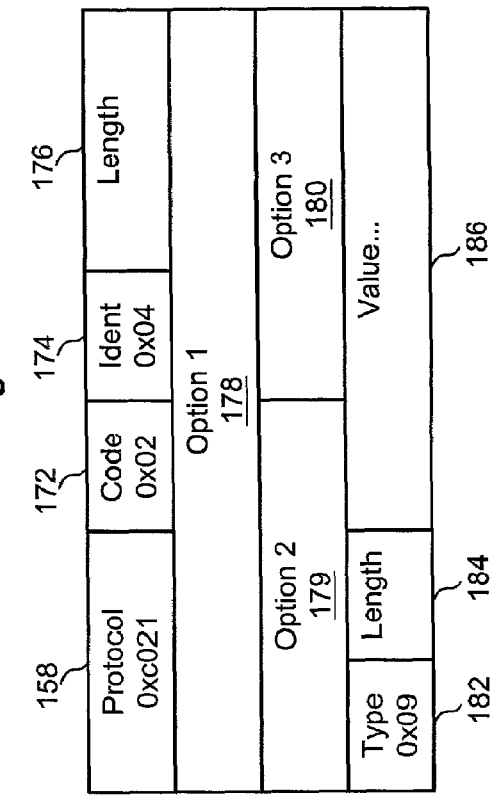
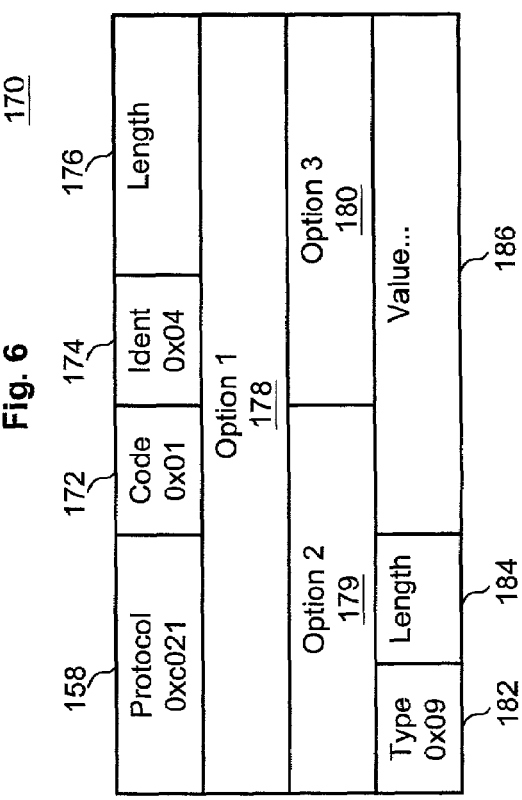

POINT-TO-POINT PROTOCOL FLOW CONTROL EXTENSION

FIELD OF THE INVENTION

This invention relates generally to point-to-point data link-layer protocols, and more specifically to providing flow control at the data link layer for such protocols.

BACKGROUND OF THE INVENTION

For digital data communication, the functions necessary for communication are generally partitioned in a layered architecture. Layer 1, the physical layer, describes the electrical or optical signaling, mechanical, and timing characteristics of a data link. Layer 2, the data link layer, determines how signals transmitted and received by the physical layer should be interpreted; generally, the data link layer provides framing, and may also include authentication, network layer address negotiation, loopback detection, and multiplexing of higher-layer protocols. Layer 3, the network layer, is responsible for end-to-end addressing and routing of packets traversing a network (or collection of networks) generally consisting of many separate data links. Four additional higher layers can provide additional high-level functionality, including packet ordering, ensuring reliable transmission, error correction, flow control, etc.

The Point-to-Point Protocol (PPP) is a data link layer protocol. It is described in Internet Engineering Task Force (IETF) Request For Comments (RFC) 1661, "The Point-to-Point Protocol (PPP)", (1994). As described in RFC 1661, PPP provides a method for encapsulating multi-protocol datagrams, a Link Control Protocol (LCP) for establishing, configuring, and testing a data link, and a family of Network Control Protocols (NCPs) for establishing and configuring different network-layer protocols.

PPP was initially envisioned for use with low-speed services, including modem connections using analog phone lines. It was found, however, that PPP served a wide variety of connection types, including high-speed lines. For instance, PPP is now deployed for use with SONET (Synchronous Optical Network) physical layer equipment, in what is known as PoS (Packet over SONET). PoS is described in IETF RFC 2615, "PPP over SONET/SDH", (1999), using HDLC (High-level Data Link Control)-like framing as described in IETF RFC 1662, "PPP in HDLC-like Framing", (1994). SONET physical links use an optical carrier with one of several defined data signaling speeds. For instance, OC-1, the slowest SONET format, signals at a rate of 51.84 Mbps (million bits-per-second). OC-12 is twelve times as fast, at 622.08 Mbps, and OC-192 is 192 times as fast, at 9,953.28 Mbps, almost ten billion bits per second.

SUMMARY OF THE INVENTION

Historically, the subject of rate control has been viewed as a problem solved by other data communication layers and not by PPP. In fact, the author of RFCs 1661, 1662, and 2615, William Simpson, followed and edited a design document in developing PPP that explicitly teaches that flow control is a feature not required by a point-to-point protocol:

> Flow control (such as XON/XOFF) is not required. Any implementation of the ISPPP is expected to be capable of receiving packets at the full rate Possible for the particular data link and physical layers used in the implementation. If higher layers cannot receive packets at the full rate Possible, it is up to those layers to discard packets or invoke flow control procedures. As discussed above, end-to-end flow control is the responsibility of the transport layer. Including flow control within a point-to-point protocol often causes violation of the simplicity requirement.

IETF RFC 1547, "Requirements for an Internet Standard Point-to-Point Protocol", (1993).

In contrast to this teaching, it is recognized herein that good reasons now exist for implementing flow control as part of a point-to-point protocol, instead of relying on transport-layer flow control. In reality, increased signaling speeds now allow situations where a PPP data link can overwhelm the computing resources used to process the data received on that link. This would not generally be the case, e.g., with one 56 Kbps PPP modem connection serving a 500 MHz desktop computer. But with a 10 Gbps PoS connection having limited receive buffer capacity, a fraction of a second's unavailability for the attached computing resources could cause buffer overflow and data loss. This is particularly likely to happen where the PoS link serves a node such as a packet router, which typically handles multiple sources of bursty data and/or is not usually a connection endpoint itself.

Consider, for example, an OC-192 PoS link between two data routers carrying primarily Internet Protocol (IP) packets. For TCP/IP packets, Transmission Control Protocol (TCP) includes TCP connection end-to-end flow control, which manages a receive buffer at each endpoint. But a single OC-192 PoS link between the two routers could conceivably carry data for thousands—even millions—of TCP connections, very few of which terminate at the same node that the PPP link terminates. As such, the TCP connections cannot effectively control (or even be aware of) the data rate on any particular intermediate PPP link of their end-to-end paths. Even if the TCP peers could attempt control, during a TCP end-to-end round-trip latency of a quarter second (for instance), 2.5 billion additional bits would arrive at the PPP receiver before a flow control command could cause a flow rate difference. To compound this flow control problem, many data sources using a PPP link may use a transport control protocol such as the User Datagram Protocol (UDP), which implements no end-to-end flow control.

If bits are simply dropped at a receiver because the network layer could not handle them fast enough, significant data losses, retransmission and slow-start inefficiencies, and noticeably degraded service will almost surely result. And the loss of data may be non-selective when a receive buffer overflows, such that low-priority and high-priority data have an equal chance of being discarded.

The present disclosure proposes an extension to PPP that is simple, robust, and provides for flow control across a PPP link. In one embodiment, the existing Link Control Protocol of PPP is extended to allow negotiation of flow control options. Once flow control is negotiated, a PPP receiver can insert flow control frames in its outgoing stream to inform its peer when flow rate should be changed. The flow control frames can simply be used to request a pause in all flows, or selected flows, at the transmit end. The transmitter, seeing a paused flow, can ideally implement policies to discard and/or buffer packets so as to cause less disruption than would be caused by discarding packets at the receive end.

BRIEF DESCRIPTION OF THE DRAWING

The invention may be best understood by reading the disclosure with reference to the drawing, wherein:

FIGS. 5–11 show LCP frame formats useful with embodiments of the present invention;

DETAILED DESCRIPTION OF THE PREFERRED EMBODIMENTS

The preferred embodiments are described below with reference to particular implementations such as might exist in a high-speed router. Such implementations are exemplary, as a high-speed router is just one type of packet-processing device that uses point-to-point protocol communications and could therefore benefit from the present invention. In general, a "packet-processing device" could be a router, a layer-2 switch, a gateway, an agent, a general-purpose computer, or a subcomponent of one of these, such as a line card or a network interface card.

Figure 1:
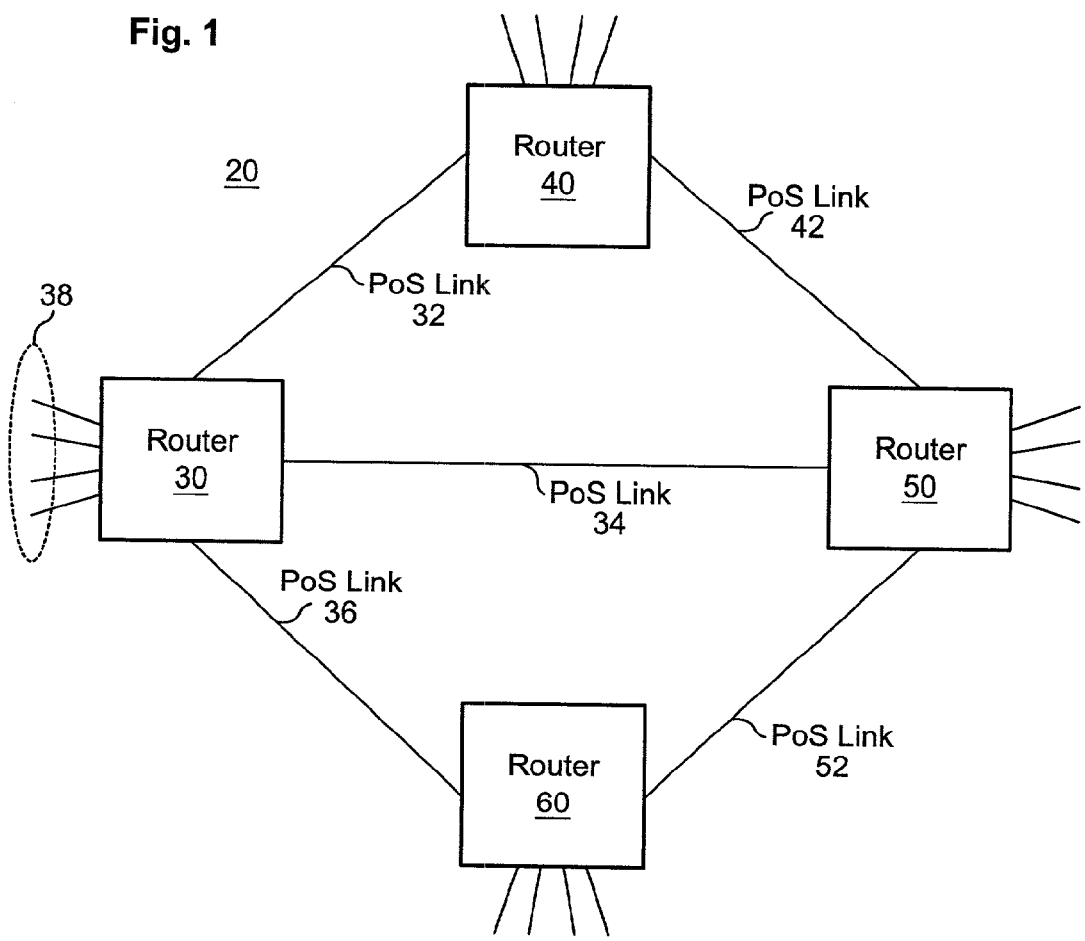
FIG. 1 illustrates a network segment containing nodes that communicate over PPP links.

As an introduction, FIG. 1 shows a hypothetical network segment 20. Four routers 30, 40, 50, and 60 are connected by bi-directional PoS links: router 30 connects to routers 40, 50, and 60 via links 32, 34, 36, respectively; routers 40 and 50 connect via link 42; and routers 50 and 60 connect via link 52. It is not necessary to operation of one PoS link that each of these links is a PoS link—for example, some links could use ISDN or ATM (Asynchronous Transport Mode) circuits, Fast Ethernet, Gigabit Ethernet, or 10-Gigabit Ethernet formats.

Each of routers 30, 40, 50, and 60 typically connects to other network nodes that are not shown in FIG. 1, e.g., via connections 38 shown on router 30. These other connected nodes could be any type of packet-processing device.

It can be envisioned from FIG. 1 that, depending on the demands of other nodes or partial equipment failure, bottlenecks could develop that would cause one of the illustrated routers, for instance router 30, to fall behind in forwarding packets received on one or more of its high-speed PoS links. Or, one of the peers of router 30 may transmit its traffic, or some class of its traffic, at a rate higher than has been negotiated for a given link. Traditionally, router 30 would respond to such conditions by dropping packets, which may or may not cause the sources of those packets to slow down.

A router that has negotiated flow control on a PoS link according to the present invention has an option other than merely dropping packets. For instance, before—or as—router 30 begins dropping packets wholesale on PoS link 32, it can send a PPP flow control packet to router 40. The PPP flow control packet requests that router 40 pause some or all traffic on link 32 for a period of time. This may afford router 30 enough time to reduce its buffer fullness. Router 40, to the extent that it has transmit buffer room, can retain packets during the pause time, or Possibly discard some packets in an intelligent manner.

Because the PPP flow control loop operates over a point-to-point link that the two peers have direct control over, the loop can respond quickly to changing conditions at the two nodes. This allows the peers to respond much quicker and more predictably than a discard scheme that relies on end-to-end flow control, and may alleviate the need for retransmission or slowing of some flows.

Figure 2:
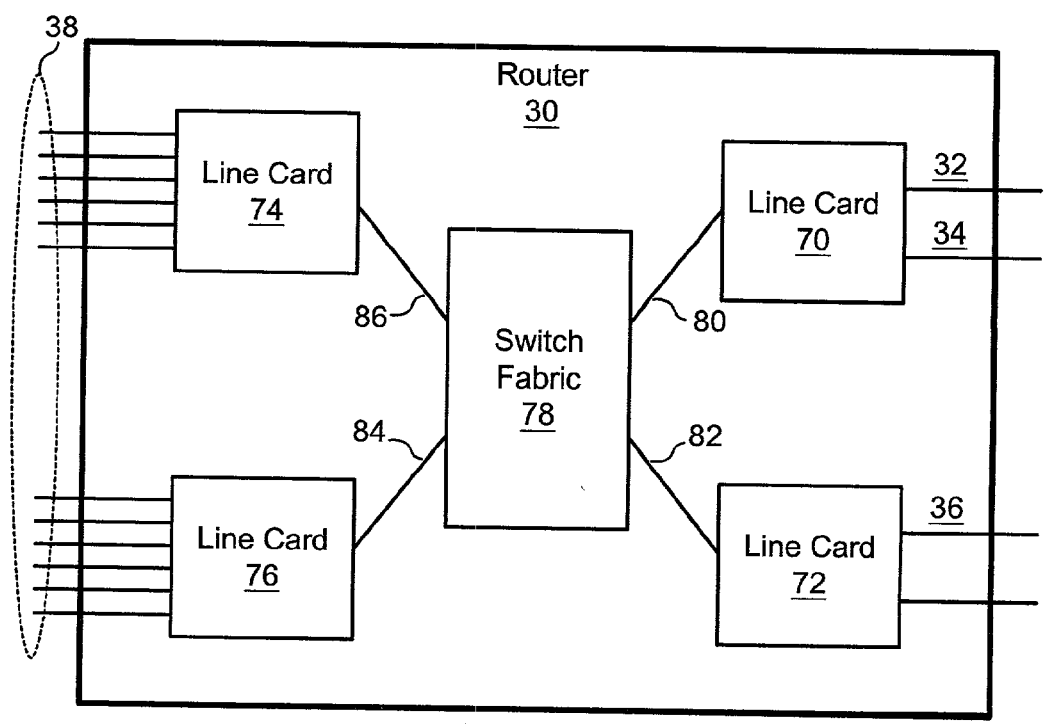
FIG. 2 shows a simplified block diagram of a modular router.

FIG. 2 shows some of the components of router 30 in more detail. Line card 70 contains physical media ports for PoS links 32 and 34. Line card 72 contains other physical media ports, including a port for PoS link 36. Line cards 74 and 76 contain physical media ports for supporting other data links, shown collectively as 38. In a modular router, the number and types of line cards can be varied to support different networking roles and capacities.

Each line card connects to one or more internal ports on switch fabric 78. For instance, line card 70 connects to switch fabric 78 via a port pipe 80, line card 72 connects to switch fabric 78 via a port pipe 82, etc. Switch fabric 78 performs traffic switching that allows each packet to enter the router at one line card port and egress the router on an appropriate egress port.

Figure 3:
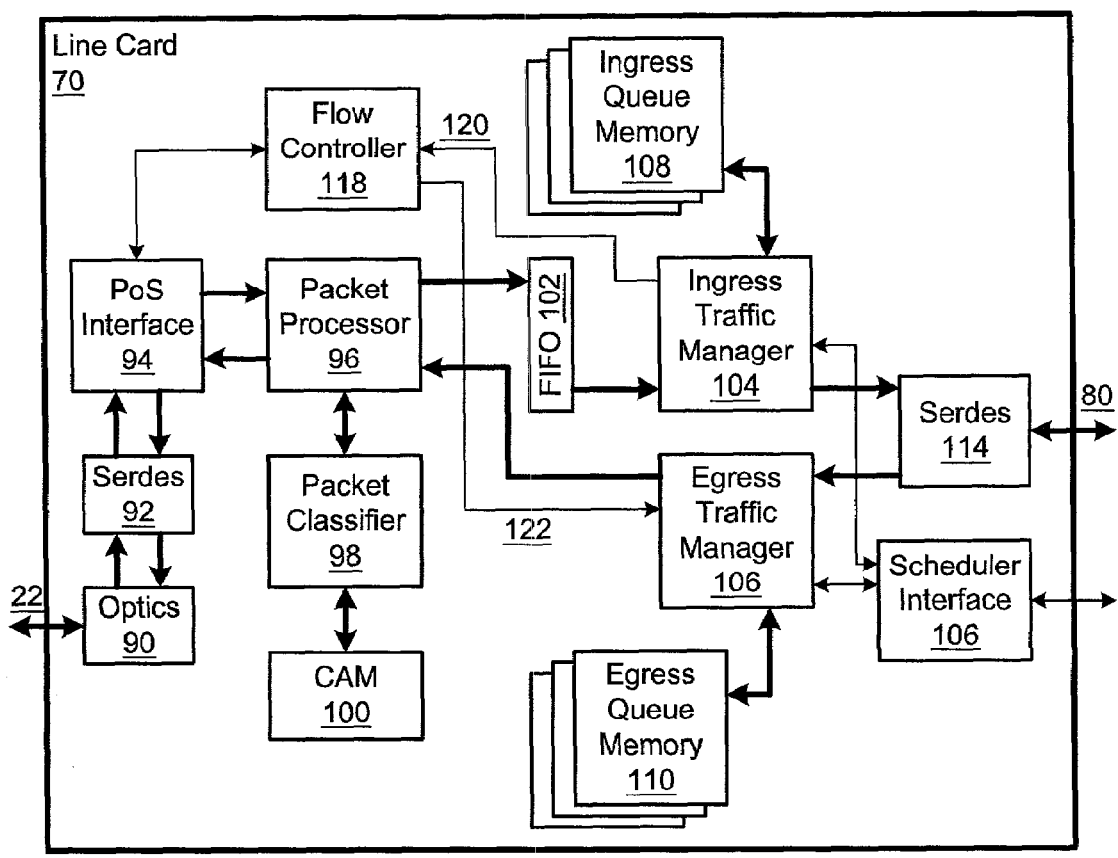
FIGS. 3 and 4 contain block diagrams for router line cards according to two embodiments of the invention.

FIG. 3 shows a partial block diagram for one embodiment of line card 70. An optical fiber 22 connects to optics 90, which contains a light modulator for transmitting signals and a receiver for detecting signals transmitted by a peer. Serializer/deserializer (serdes) 92 creates the analog electrical waveforms that drive the light modulator from parallel digital data received on a bus from PoS interface 94. Likewise, serdes 92 receives analog electrical waveforms after conversion by the optical receiver, detects a digital bitstream in those waveforms, and converts the bitstream to parallel digital data. The parallel digital data is transmitted to PoS interface 94 over a bus. Optics 90 and serdes 92 can be considered together as one example of a physical media port capable of point-to-point full duplex data transfer with a physical media peer.

PoS interface 94 converts data between the serdes parallel format and the packet processor format, performs other well-known PPP tasks, and participates in PPP flow control as will be described shortly. When PoS interface 94 receives an egress packet from packet processor 96, it generates a frame check sequence (FCS), adds the FCS and flags the beginning/end of the frame, performs byte and bit stuffing as required, scrambles the data, and places the scrambled data in the appropriate SONET framing format. SONET-framed data is presented to serdes 92 for transmission over the optical link. As PoS interface 94 receives PoS data from serdes 92, it decodes the SONET framing and reverses the process above to supply ingress packets to packet processor 96.

Packet processor 96 works in conjunction with packet classifier 98 and content-addressable memory (CAM) 100 to perform packet routing and other packet header updating for each packet received. Ingress packets also receive a backplane header that aids in traffic shaping, queuing, and routing across the switch fabric. Packet processor 96 strips the backplane header for egress packets and places them in a format expect by PoS interface 94.

When ingress packets leave packet processor 96, they pass through a FIFO buffer 102 to ingress traffic manager 104. Ingress traffic manager 104 polices incoming traffic, drops packets as necessary to keep traffic within a designated profile, and queues packets bound for the switch fabric in ingress queue memory 108. As switch fabric queues fill, ingress traffic manager 104 notifies a switch fabric scheduler (not shown) of pending traffic via scheduler interface 112. The scheduler notifies traffic manager 104 when to supply traffic from each queue to serdes 114 for switching through the switch fabric.

Egress traffic manager 106 performs analogous functions for egress traffic received from the switch fabric via serdes 114. Egress queue memory 110 stores egress-side packets in queues for scheduling to packet processor 96.

FIG. 3 shows two additional control lines useful with one embodiment of the invention. Control line 120 allows ingress traffic manager 104 to signal flow controller 118 whenever a flow control packet could help reduce congestion in ingress queue memory 108. Control line 122 allows flow controller 118 to signal egress traffic manager 106 when a PPP flow control packet has been received from a peer. After introduction of exemplary PPP flow control formats and option negotiation, operation of this embodiment will be further explained.

Figure 4:
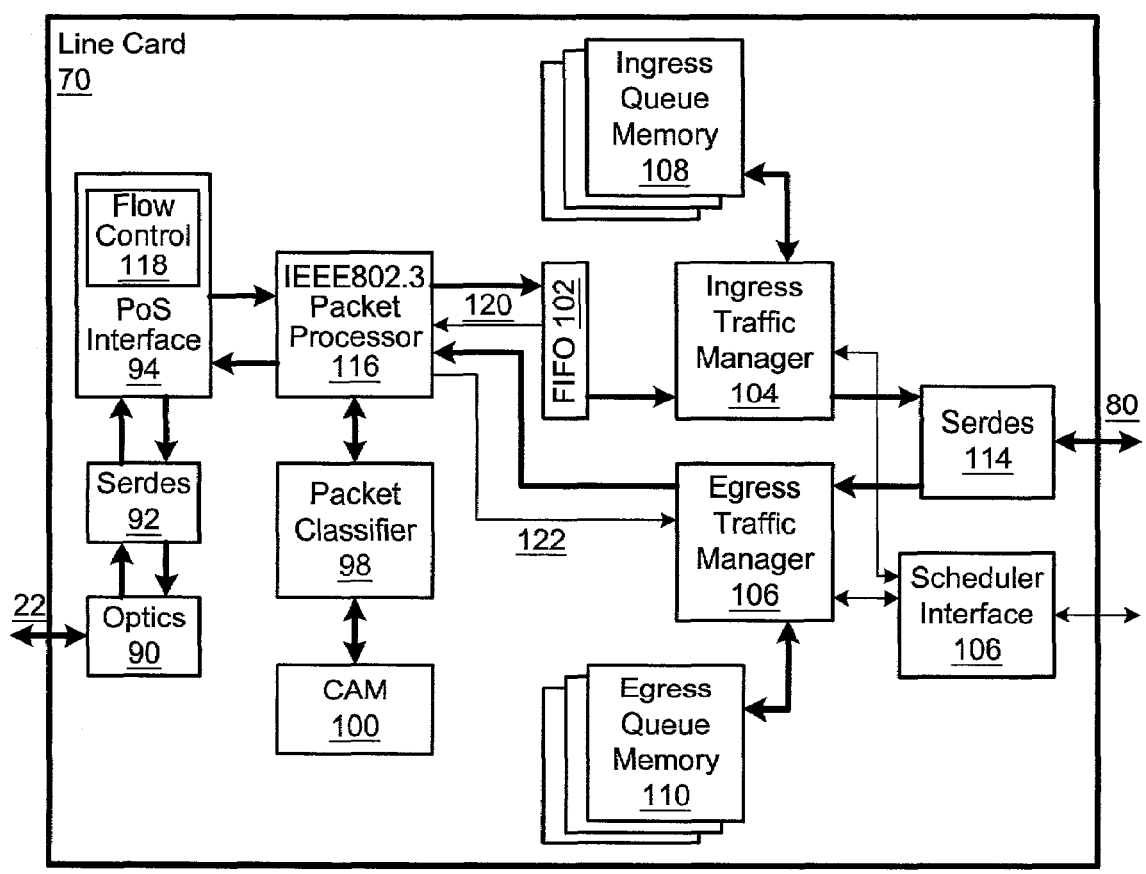

FIG. 4 is identical in most respects to FIG. 3. But in FIG. 4, packet processor 96 has been identified as a packet processor 116 that includes an IEEE802.3 Media Access Controller (as used herein, IEEE802.3 refers to the group of well-known standards promulgated by the Institute of Electrical and Electronics Engineers, referred to by the numbering prefix "802.3", and defining what is often referred to as "Ethernet" protocol). Although IEEE802.3 is not technically a point-to-point protocol, IEEE standard 802.3x ("IEEE802.3x") does provide a rudimentary flow control functionality that is exploited in the embodiment of FIG. 4. In this embodiment, flow controller 118 processes received PPP flow control packets by repackaging them in a format recognizable by the IEEE802.3 MAC and passing them to packet processor 116. The IEEE802.3 MAC recognizes the packets as if they had come from an IEEE802.3 MAC peer and pauses the outgoing packet stream accordingly.

Likewise, the IEEE802.3 MAC can generate IEEE802.3x MAC control frames when a pause in incoming packet flow is desired. Flow controller 118 captures such packets, repackages them (if PPP flow control has been negotiated), and sends them to a PPP peer.

FIGS. 5 through 11 illustrate packet formats useful with some embodiments of the invention. FIG. 5 shows a PPP frame conforming to RFC 1662. Flag sequences 152 and 166 contain the octet 0x7e (where the prefix 0x designates hexadecimal notation). The flag sequences delineate the beginning and end of a PPP frame. Address field 154 and control field 156 are also set to specific values (0xff and 0x03, respectively) that identify a valid PPP frame. Protocol field 158 identifies the protocol to be applied to payload 160, which can, e.g., contain an IP datagram. Padding 162 can be used as appropriate, and is followed by a FCS 164 that provides error detection.

In addition to encapsulating IP and other datagrams, a PPP implementation can insert frames in an outgoing data stream—with protocol fields to designate that such frames contain a direct communication to a PPP peer. One example of such a protocol is Link Control Protocol (LCP), which is defined in RFC 1661. LCP frames have their protocol field set to 0xc021, and contain a message to the PPP peer in their payload. Among other things, these messages are used to negotiate the configuration of a PPP link.

FIG. 6 shows one type of LCP frame that can be generated by a device operating according to an embodiment of the invention. Frame 170 illustrates a Configure-Request LCP frame—a PPP implementation receiving frame 170 recognizes it as such by the LCP protocol in protocol field 158 and the LCP code 0x01 in code field 171. The identifier field 174 contains a value that distinguishes the Configure-Request frame from other Configure-Request frames that the originator may have recently sent. The length field 176 allows the receiver to know when to stop reading options from the message.

The Configure-Request frame contain options that pertain to the frames received by the sender of the request. Many options have defaults, which will be used if an option is not included in a Configure-Request frame. Those options that are present are to be presented in ascended order according to option type. In the example of FIG. 6, three unspecified options 178, 179, and 180 are shown preceding a new option, which is illustrated in field 182 as having a type 0x09 corresponding to a new flow control option. If the flow control option is missing from a Configure-Request frame, the default behavior is no flow control. If the option is present, the sender is requesting the ability to send flow control frames to regulate its inflow of data frames.

Figure 8:
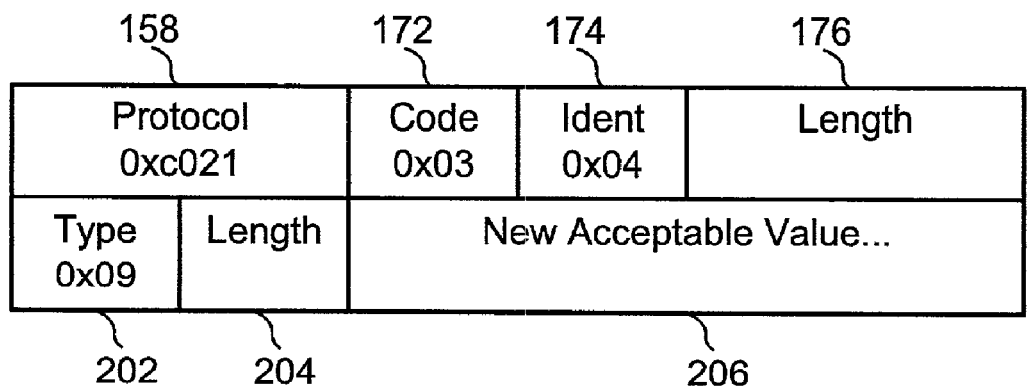
Figure 9:
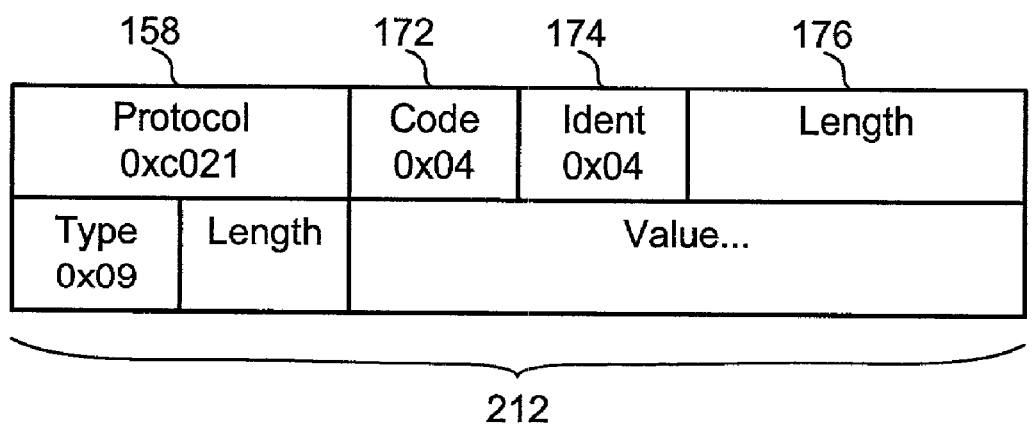

Upon receiving a Configure-Request with a flow control option, a PPP implementation has three choices, illustrated by FIGS. 7, 8, and 9, respectively. If the PPP implementation accepts all of the requested configuration parameters, it returns a Configure-Ack LCP frame 190 to its peer, with the same identifier as the Configure-Request frame, and the same options that were requested. Upon receiving frame 190, the configuration-requesting node has successfully negotiated a flow-control option that allows it to send flow control frames to its peer.

In some situations, a PPP implementation may be willing to accept flow control instruction, but not according to the option requested in frame 170. In such a situation—and assuming that the other options in frame 170 are acceptable—the appropriate response is to return a Configure-Nak LCP frame 200. The Configure-Nak frame contains the rejected flow control option, but fields 204 and 206 will pertain not to the original option parameters of fields 184 and 186, but to a new set of option parameters that would be acceptable to the peer. More than one set of option parameters could exist in the Configure-Nak frame, if more than one set is acceptable.

Another Possible response to a Configure-Request frame is illustrated by Configure-Reject LCP frame 210 in FIG. 9. The Configure-Reject frame instructs the Configure-Request sender that one (or more) of the requested options cannot be negotiated or cannot be recognized, e.g., in the present illustration when the peer does not have flow control capability. The unacceptable option is returned in field 212.

Figure 10:
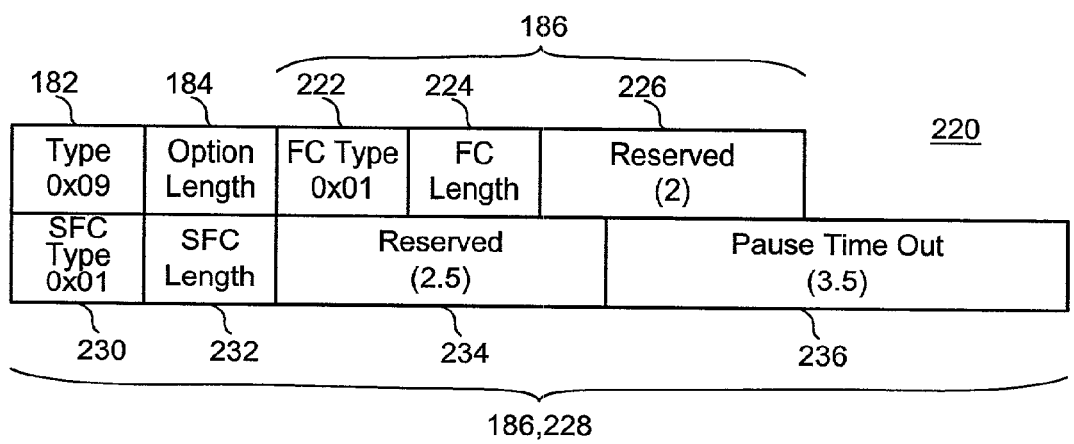

At least two different types of flow control options are envisioned for the LCP protocol—Simple Flow Control and Service Flow Control. FIG. 10 shows a typical Simple Flow Control Option field 182 with its appurtenant fields 184 and 186. Option length field 184 contains the length in octets of the entire option, including fields 182, 184, and 186. Field 186, the option payload, contains two nested information areas. Flow control type field 222 contains the value 0x01, which indicates this is a Simple Flow Control option request. Flow control length field 224 contains the length in octets of the flow control option payload, including fields 222, 224, 226, and 228. Field 228 contains the Simple Flow Control option parameters.

Within field 228, a Simple Flow Control type field 230 must have the value 0x01, which means that the flow control type is a pause time out (the protocol could be expanded to include other types of Simple Flow Control, such as percent rate reduction, by adding other valid type values). Simple Flow Control length field 232 contains the length in octets of field 228. Pause Time Out field 236 contains the number of byte times that a pause time out can occupy, where a "byte time" is defined as 8/(link speed in bps).

Figure 11:
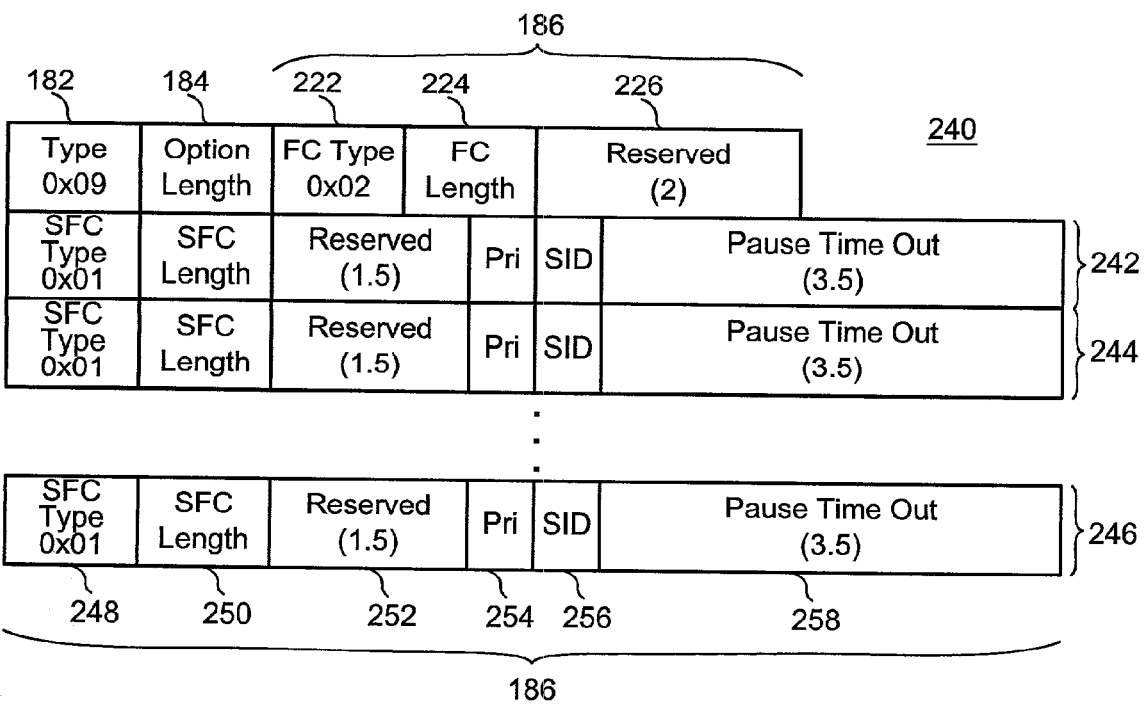

FIG. 11 shows a typical Service Flow Control Option field 182 with its appurtenant fields 184 and 186. Flow control type field 222 contains the value 0x02, which indicates that this is a Service Flow Control option request. Fields 242, 244, and 246 contain the Service Flow Control option parameters, each of these fields representing a service class. This allows the peers to negotiate a number of service class IDs, the priority associated with each ID, and the flow control behavior for each ID. Up to sixteen service class IDs and priority values can be assigned in the illustrated format.

Considering field 246 as exemplary, sub-field 248 indicates the Service Flow Control option format followed in field 246—in this case, the Service Class option 0x01(other option classes could also be defined). Service Flow Contact length sub-field 250 indicates the total length of field 246. Priority field 254 indicates the priority assigned to the service class indicated in Service ID (SID) field 256. Finally, pause time out sub-field 258 contains the number of byte times that a pause time out can occupy, where a "byte time" is defined as 8/(link speed in bps). In this format, up to sixteen priorities and sixteen SIDs can be defined. The priorities and SIDs need not map one-to-one.

Figure 12A:
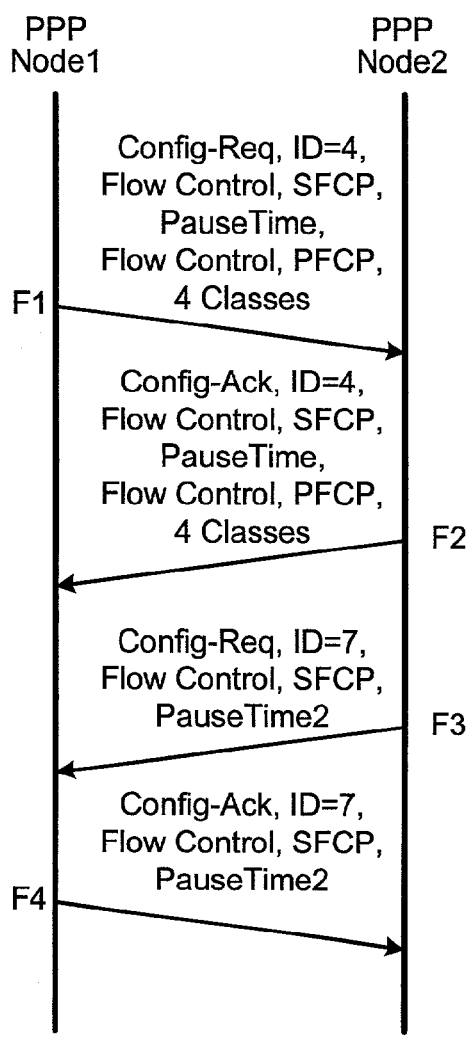
FIGS. 12a–c illustrate link configuration message exchange according to embodiments of the invention.

With packets, flow control options, and option parameter formats described, several exemplary LCP option negotiation sessions will now be described. FIG. 12*a* illustrates a negotiation session between two PPP peers, Node1 and Node2, that each implement Simple Flow Control and Service Flow Control as described above. During options negotiation, Node1 sends Configure-Request frame F1 to Node2. Frame F1 requests both Simple Flow Control and Service Flow Control (PFCP) be allowed. Frame F1 may contain other PPP options as well, but these have been omitted for clarity. As these requests are acceptable to Node2, Node2 returns Configure-Ack frame F2, repeating the identifier and options of frame F1. Node1 then knows that it can send either Simple Flow Control or Service Flow Control frames to Node2 during this session.

Node2 negotiates the parameters for its end of the link by sending FCP frame F3 to Node1, requesting only Simple Flow Control capability. Although Node1 could handle Service Flow Control, it agrees to respond to only Simple Flow Control frames by repeating the parameters of frame F3 in Configure-Ack frame F4.

Figure 12B:
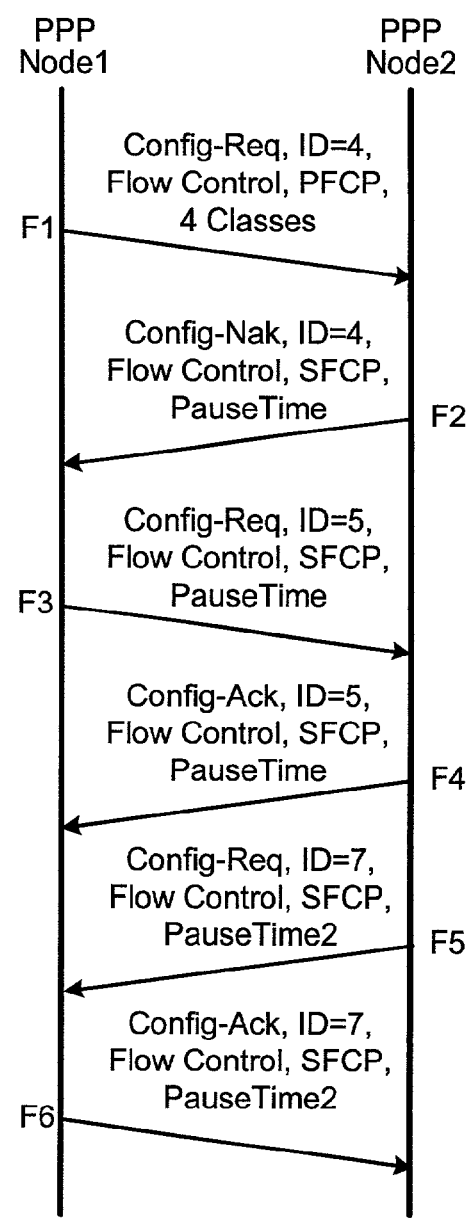

FIG. 12*b* illustrates an LCP option negotiation session where Node2 cannot operate according to the Service Flow Control protocol. Node1, unaware of this, sends Configure-Request frame F1 to Node2 to request four-class Service Flow Control. Node2 refuses the request by transmitting a return Configure-Nak frame F2. Frame F2 contains a flow control option with parameters that would be acceptable to Node2, e.g., Simple Flow Control with a suggested Pause Time. The Pause Time could, for instance, correspond to the available transmit buffer space that Node2 could use to buffer frames during a pause. Node1 transmits a new Configure-Request frame F3, including the Simple Flow Control parameters received in frame F2. Node2 accepts the options of frame F3 by returning a Configure-Ack frame F4. Node2 also negotiates Simple Flow Control for its end of the link as shown in frames F5 and F6, in similar fashion to the previous example.

Figure 12C:
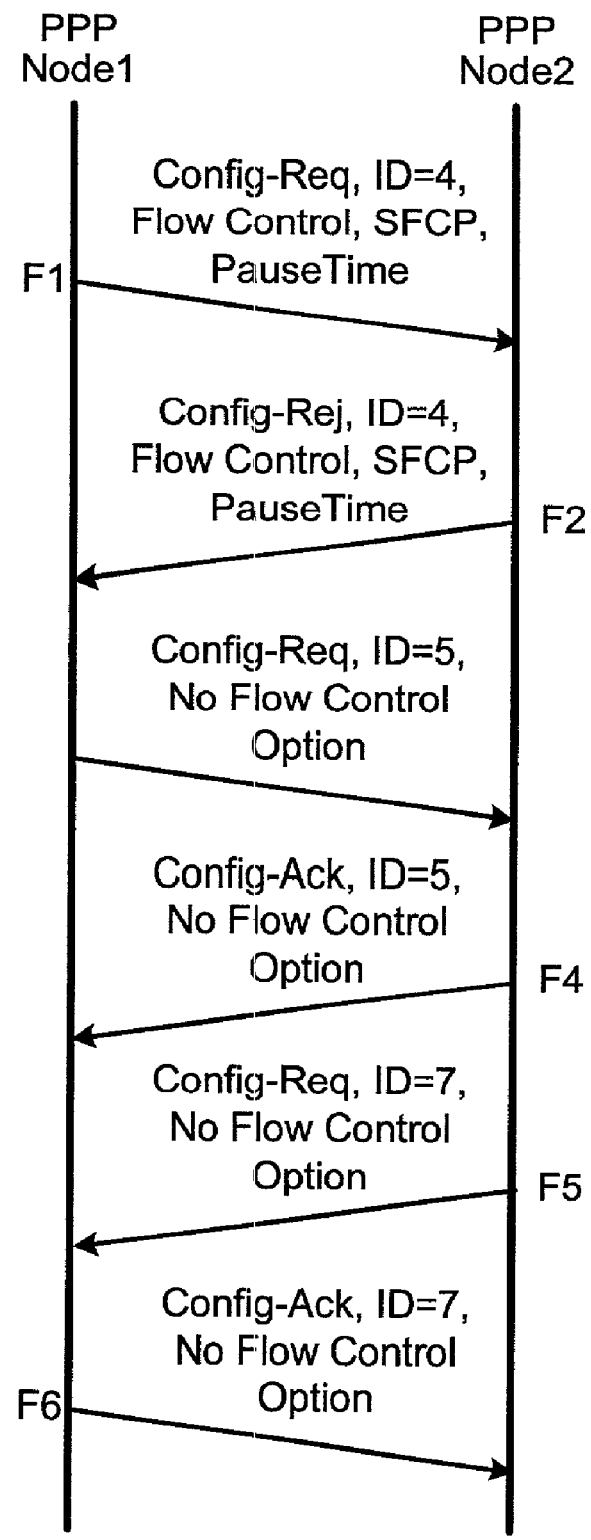

FIG. 12*c* illustrates an LCP option negotiation session where Node2 either does not recognize or refuses to participate in flow control. Node1, unaware of this, sends Configure-Request frame F1 to Node2 to request Simple Flow Control. Node2 returns Configure-Reject frame F2, repeating the flow control option to inform Node1 that it will not accept any flow control option. Unless Node1 wants to drop the connection, it must transmit a new Configure-Request frame F3 that contains no flow control option. As this is of course acceptable to Node2, Node2 returns a Configure-Ack packet F4. Node2 also negotiates its end of the link with Configure-Request frame F5, which contains no flow control option. As the default behavior is no flow control, Node1 returns a Configure-Ack packet F6 and neither end of the link will use flow control.

As illustrated by the above examples, the proposed flow control extensions to the LCP protocol can provide a simple, robust, and orderly process for negotiating PPP flow control, even when the PPP nodes have different (or no) flow control capability.

Assuming that PPP flow control has been negotiated, a conforming endpoint can then generate and respond to PPP flow control frames, as will now be described. Although one protocol type could, in some embodiments, be used for both Simple and Service Flow Control, there can be advantages to having separate protocol types for Simple and Service Flow Control.

Figure 13:
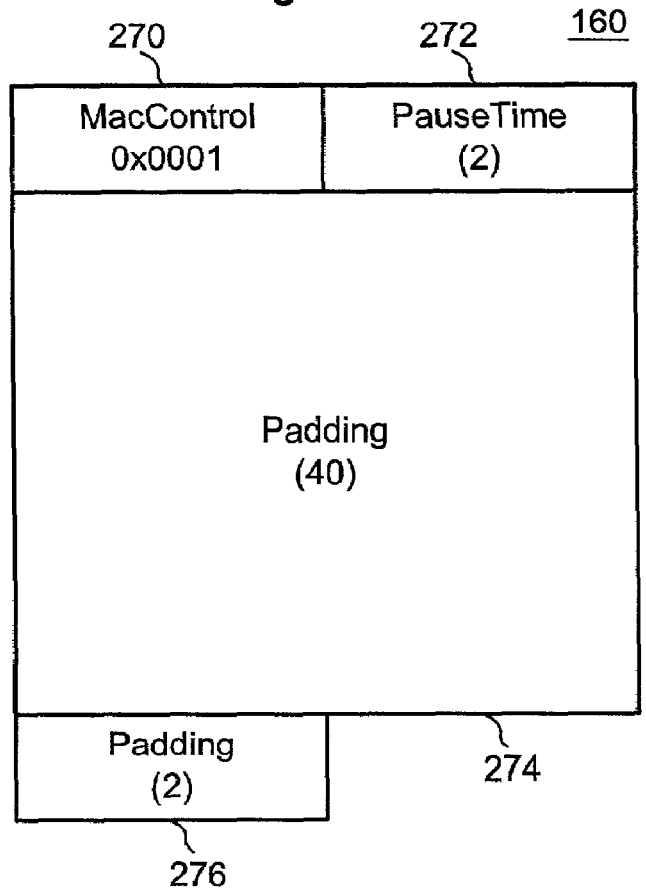
FIG. 13 shows a PPP flow control frame format according to an embodiment of the invention.

In one embodiment, Simple Flow Control has its own PPP protocol, which will be referred to as SFCP. The value for this protocol, e.g., 0xc4c1, is inserted in protocol field 158 of FIG. 5, and the flow control payload is inserted in payload field 160. Referring to FIG. 13, the SFCP payload 160 is illustrated with four fields 270, 272, 274, and 276. This payload is, not coincidentally, the same payload carried by an IEEE802.3x PAUSE frame (albeit without a MAC header). MacControl field 270 contains the opcode 0x0001, which to an IEEE802.3 MAC signifies a PAUSE frame. PauseTime field 272 contains a request for a time to pause traffic, expressed in 512-bit times. Fields 274 and 276 contain padding expected by an IEEE802.3 MAC.

Figure 14:
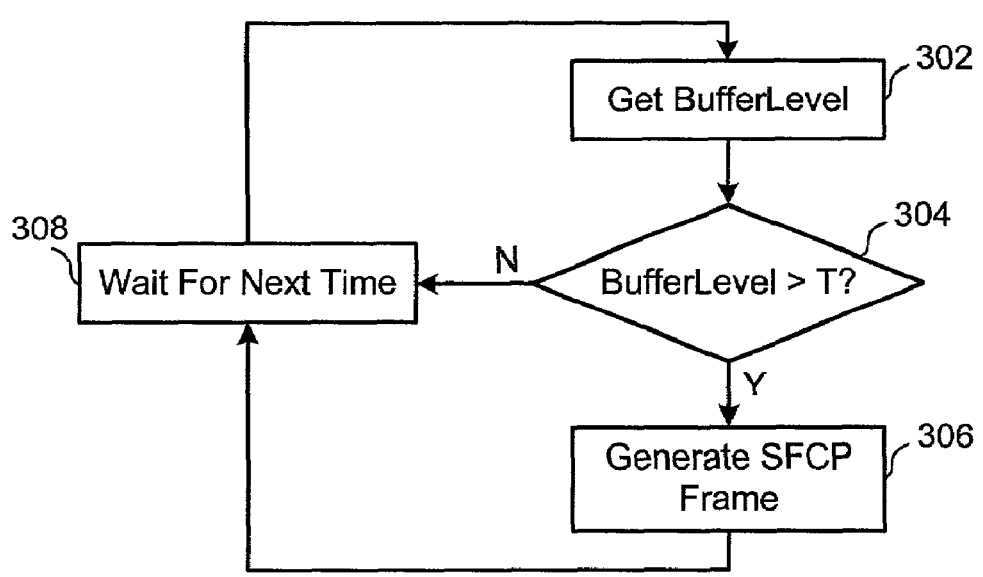
FIG. 14 contains a basic flow chart for Simple Flow Control packet generation.

With a device like that of FIG. 3, SFCP frames can be generated with flow controller 118 and PoS interface 94 according to flowchart 300 of FIG. 14. At block 302, flow controller 118 receives notification of receive buffer fullness over signal line 120, e.g., as a value BufferLevel. Block 304 compares BufferLevel to a threshold T. If BufferLevel is below T, control is transferred to block 308, which places the flow control loop in a wait state until it is time to reevaluate BufferLevel. But if BufferLevel is above T, control is transferred to block 306, which causes a PPP frame with a payload like that of FIG. 13 to be generated and placed in the PPP output stream.

Although signal line 120 is shown in FIG. 3 as originating from ingress traffic manager 104 and terminating at flow controller 118 within PoS 94, many other Possibilities exist. The flow controller could reside within PoS interface 94, within the ingress traffic manager, or within packet processor 96. The buffer of interest could be queue memory 108, FIFO 102, or an internal buffer within one of blocks 94, 96, or 104.

In one implementation, exemplified by FIG. 4, packet processor 116 comprises an IEEE802.3 MAC capable of generating IEEE802.3x control frames. Due to the intervening PPP link, the MAC cannot communicate with an IEEE802.3x peer at the other end of the link—indeed, it is possible that no such peer exists even if it were possible to peer across the PPP link. But if so enabled, the MAC can generate IEEE802.3x control frames. PoS interface 94 scans for such frames: if SFCP is disabled, PoS interface 94 removes these MAC control frames from the outgoing data stream; if SFCP is enabled, it extracts the IEEE802.3x payload from the MAC control frame, repackages it as a PPP SFCP frame, and transmits it to the peer.

The logic that causes generation of a SFCP frame could have varying degrees of complexity beyond a simple one-threshold comparison. For instance, if the threshold is surpassed, the generated PauseTime could be a function of how far the threshold is surpassed. Multiple PauseTime values could be paired with multiple thresholds. Or the rate of change of the variable BufferLevel could be calculated and used to evaluate when to generate an SFCP frame. The round-trip latency of the link could be estimated, e.g., during LCP link initialization, and used as a parameter in the frame-generation logic. The logic may not even relate to buffer fullness at all, but to another measure, such as whether the PPP peer is exceeding an allocated average flow rate.

Figure 15:
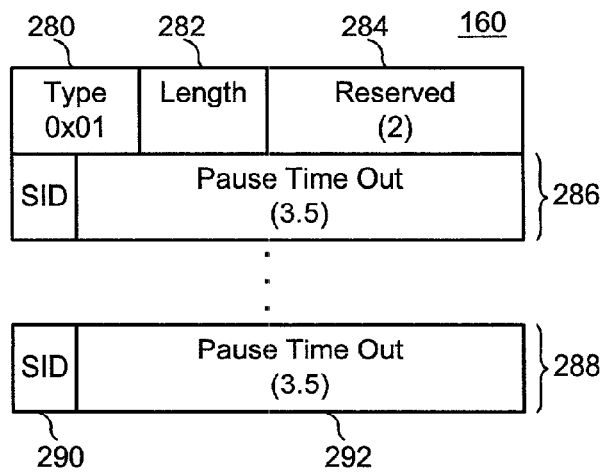
FIG. 15 shows a PPP flow control frame format according to another embodiment of the invention.

In one embodiment, Service Flow Control also has its own PPP protocol, which will be referred to as PFCP (Priority Flow Control Protocol). The value for this protocol, e.g., 0xc4c3, is inserted in protocol field 158 of FIG. 5, and the flow control payload is inserted in payload field 160. Referring to FIG. 15, the PFCP payload 160 is illustrated with fixed-length fields 280, 282, and 284, and a variable-length field comprising fields 286 and 288. Type field 280 must contain the value 0x01, which corresponds to a Service Pause format (other formats can of course be devised for other schemes). Length field 282 indicates the total length of payload 160 in octets. Service fields 286 and 288 have identical formats, but in a given packet will pertain to different service classes. The number of such fields in payload 160 can vary between one and sixteen in the disclosed implementation. The PFCP receiver can detect the number of fields present from length field 282.

Considering service field 288 as exemplary, it contains two sub-fields 290 and 292. Sub-field 290 contains a valid SID. Sub-field 292 contains a corresponding PauseTime for that SID, expressed in byte times. Zero is a valid value for sub-field 292, and indicates that the corresponding SID may restart transmission immediately (if paused).

Figure 16:
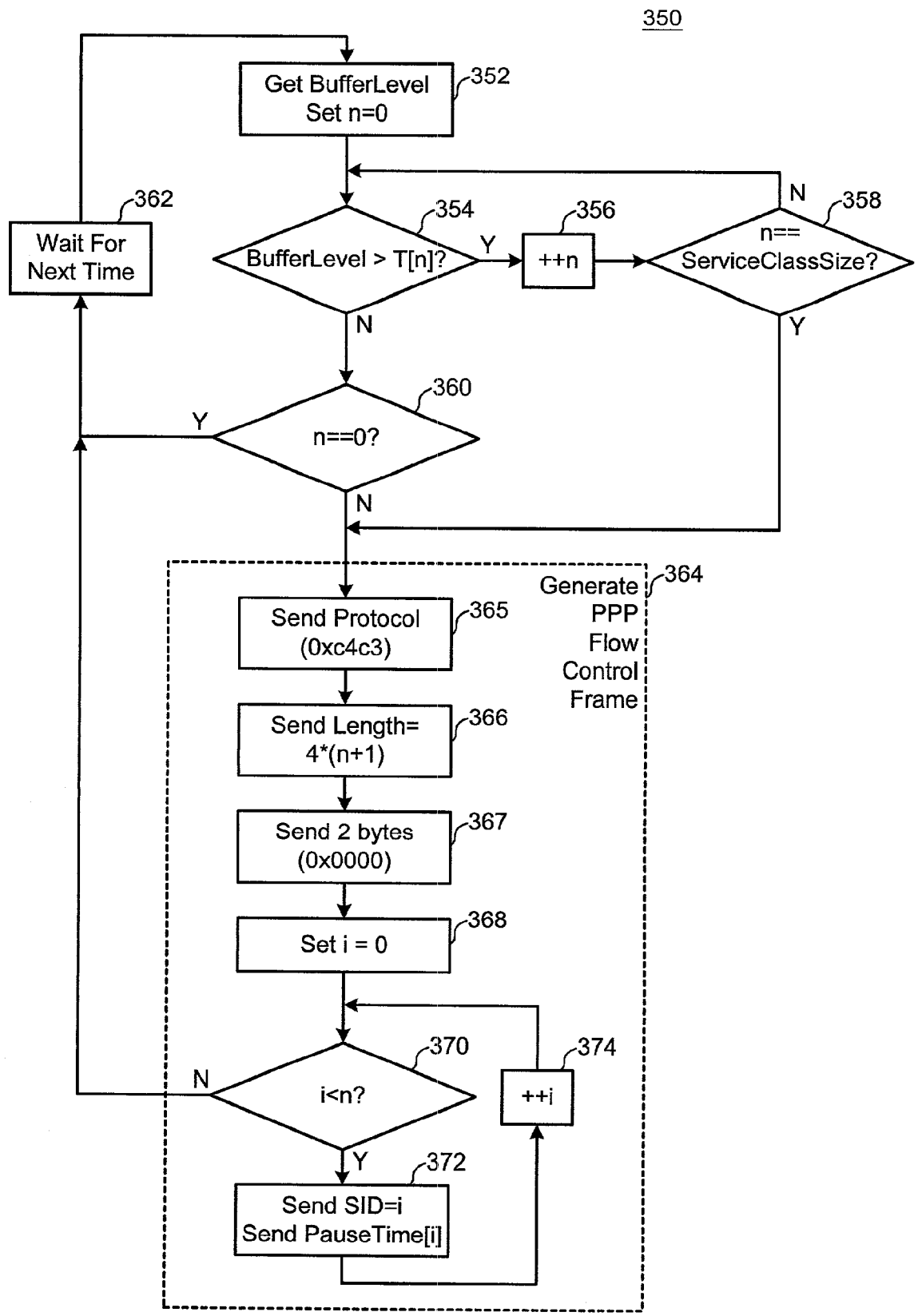
FIG. 16 contains a basic flow chart for Service Flow Control packet generation.

With a device like that of FIG. 3, PFCP frames can be generated with flow 15: controller 118 and PoS interface 94 according to flowchart 350 of FIG. 16. At block 352, flow controller 118 receives notification of receive buffer fullness over signal line 120, e.g., as a value BufferLevel, and sets a counter value n to zero. Blocks 354, 356, and 358 comprise a loop that compares BufferLevel to thresholds from a threshold array T[n], with an array size ServiceClassSize equal to the number of negotiated service classes. At block 354, if BufferLevel is above T[n], control is transferred to block 356 and 358, which respectively increment n and then check whether n has reached the top of the array. If the top of the array has not been reached, another loop is initiated to compare BufferLevel to the next threshold. If the top has been reached, control passes to block 364. If, however, block 354 found a T[n] greater than BufferLevel prior to reaching the end of the threshold array, control passes through block 360 before passing to block 364. Block 360 checks n, and if n is zero (BufferLevel below all thresholds), control passes to block 362 where the routine waits for the next evaluation time. Block 364 generates a PFCP flow control frame, and includes subblocks for calculating packet length (block 366) and a loop for generating service fields for the SIDs to be paused (blocks 370, 372, and 374). Note that an array of PauseTimes is used to generate the frame, allowing each SID to have a unique PauseTime.

Flow chart 350 could have additional levels of complexity, some of which were suggested above for flow chart 300 (FIG. 14). Other possibilities include basing PauseTimes on recently observed statistics for the bandwidth occupied by various service classes—this suggestion recognizes that flow control may be ineffective if it does not affect the major users of bandwidth. Such statistics could be made available from ingress traffic manager 104 (FIG. 3).

Figure 17:
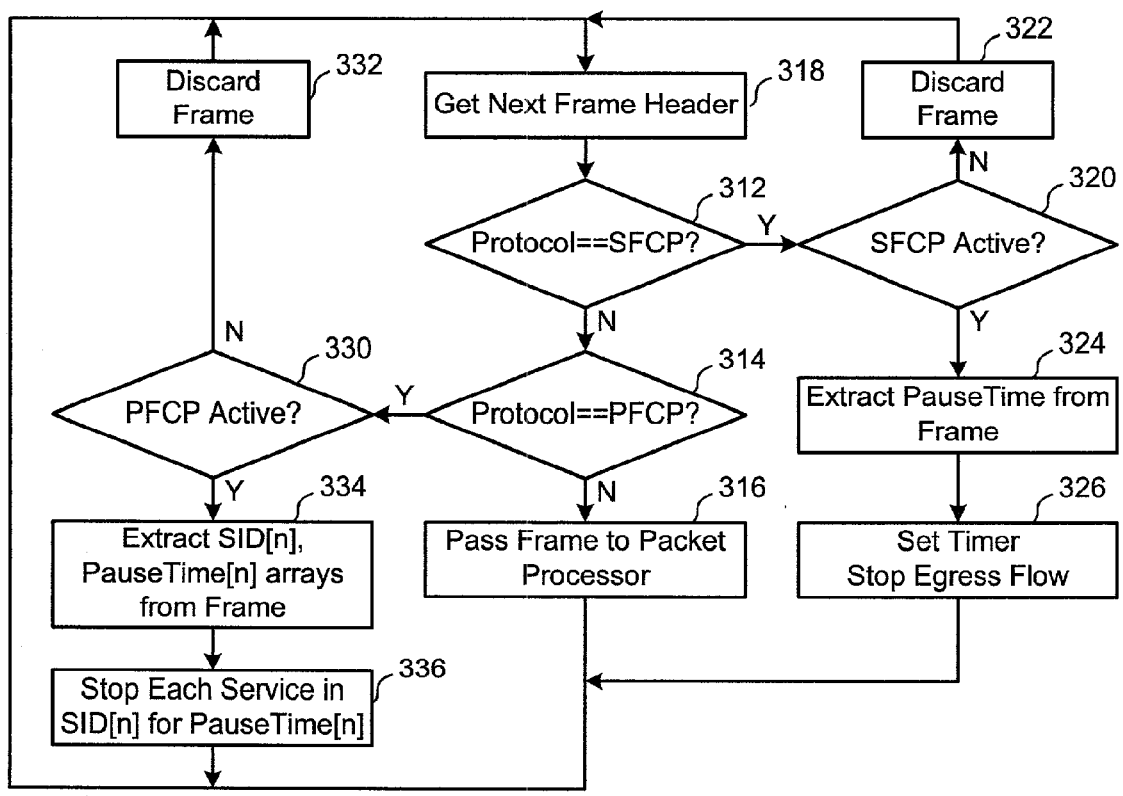
FIG. 17 contains a basic flow chart for an implementation responding to Simple and Service Flow Control frames.

When flow control packets are generated by one PPP endpoint, the PPP peer of that endpoint has agreed to detect and respond to those packets. FIG. 17 shows an exemplary packet-processing flow chart 310 for a device that can receive either SFCP or PFCP frames. As ingress frames are processed by, e.g., PoS interface 94 of FIG. 3, blocks 312 and 314 compare the ingress frame protocol field value to the values that signify an SFCP or PFCP frame. If an ingress frame protocol field has neither value, block 316 passes the frame to the packet processor (assuming that the protocol is not another recognized PPP frame type, such as an LCP, PAP, or CHAP frame. In reality, a check to see if the first octet of the protocol contains 0xc0 or higher could be used as a prefilter for all these protocol types as well as SFCP and PFCP). Block 318 then gets the next frame header and the process repeats.

When the frame protocol matches the SFCP protocol type, control transfers to block 320 for a check as to whether SFCP was negotiated and is active for the link. If not, block 322 discards the frame, and could also Possibly generate a LCP Protocol-Reject frame back to the peer. If SFCP is active and negotiated, the PauseTime transmitted by the peer is extracted from the frame at block 324. Block 326 sets a resume timer and signals a stop of egress packet flow, e.g. to egress traffic manager 106 over signal line 122 of FIG. 3. At the expiration of the timer, another signal can restart egress packet flow.

When the packet processor can recognize and respond to IEEE802.3x PAUSE control frames, as can packet processor 116 of FIG. 4, blocks 324 and 326 are unnecessary. Instead, the SFCP frame can be repackaged as an IEEE802.3x PAUSE control frame and passed to packet processor 116 for flow pausing.

When the frame protocol matches the PFCP protocol type, control passes from block 314 to block 330 for a check as to whether PFCP was negotiated and is active for the link. If not, block 332 can take discard action similar to that of block 322. If PFCP is active and negotiated, block 324 extracts two arrays of N values from the frame, a Service ID array SID[n] and a pause time array PauseTime[n]. Block 326 then signals egress traffic manager to stop each ID in SID[n] for the corresponding PauseTime[n]. Note that flowchart 310 will likely include additional steps to check that the transmitted flow control fields make sense—such steps have been omitted for clarity.

Several embodiments have been presented herein. Those skilled in the art will recognize that depending on the particular packet-processing device, PPP flow control functionality could be embodied in hardware, software, or a mixture of the two. For a software embodiment, an embodiment can comprise computer instructions contained on a computer-readable medium, i.e., optical, magnetic, or semiconductor storage devices. When such instructions are executed or interpreted by one or more processors within a packet-processing device, they cause the packet-processing device to perform PPP flow control functions such as described above.

Although the currently published PPP implementation has been referenced herein, it is recognized that PPP will likely evolve in the future, or that other PPP-like protocols are Possible. The scope of the attached claims is intended to cover all such point-to-point data link layer protocols, but not protocols that operate at different layers (such as TCP), or protocols such as IEEE802.3, which use source/destination addressing and are operable on multiple-access data links.

What is claimed is:

1. A method of operating a packet-processing device comprising:
   receiving a point-to-point protocol packet stream from a point-to-point protocol peer over a point-to-point full-duplex data link;
   analyzing whether conditions at the device support an adjustment in the flow rate of the received packet stream; and
   when an adjustment in the flow rate is supported, generating a point-to-point protocol flow control frame requesting that the peer adjust the flow rate of the packet stream, and sending the point-to-point protocol flow control frame to the peer over the data link while the packet-processing device is receiving the point-to-point protocol packet stream.

2. The method of claim 1, wherein analyzing whether conditions at the device support an adjustment in the flow rate of the packet stream comprises:
   estimating the average flow rate of the packet stream over a selected period of time;
   comparing the average flow rate to an allocated flow rate for that packet stream; and
   when the average flow rate exceeds the allocated flow rate, indicating support for a decrease in the flow rate of that packet stream.

3. The method of claim 1, wherein analyzing whether conditions at the device support an adjustment in the flow rate of the packet stream comprises:
   examining the condition of a receive buffer in the device;
   comparing the receive buffer condition to target receive buffer conditions; and
   indicating support for an adjustment in the flow rate of the packet stream when the receive buffer condition falls outside the target receive buffer conditions.

4. The method of claim 3, wherein comparing the receive buffer condition to target receive buffer conditions comprises comparing receive buffer fullness to a target receive buffer fullness.

5. The method of claim 3, wherein examining receive buffer condition comprises predicting a future value of receive buffer fullness using a current value of receive buffer fullness and a calculated rate of change in buffer fullness.

6. The method of claim 1, wherein when a downward adjustment in the flow rate is supported, the generated flow control frame requests that the peer pause all data packet flow for a pause time.

7. The method of claim 6, wherein the generated flow control frame contains a payload conforming to an accepted format for an IEEE802.3x MAC control frame payload.

8. The method of claim 1, wherein when a downward adjustment in the flow rate is supported, the generated flow control frame indicates a decrease for at least one priority from a set of flow priorities.

9. The method of claim 8, wherein a given priority corresponds to a service class, and is accompanied by a request that the peer pause data packet flow for a pause time, for that service class.

10. The method of claim 9, wherein the generated flow control frame contains requests corresponding to multiple service classes.

* * * * *

UNITED STATES PATENT AND TRADEMARK OFFICE
CERTIFICATE OF CORRECTION

PATENT NO. : 7,062,568 B2  Page 1 of 1
APPLICATION NO. : 10/061916
DATED : June 13, 2006
INVENTOR(S) : Tissa Senevirathne and Somsubhra Sikdar It is certified that error appears in the above-identified patent and that said Letters Patent is hereby corrected as shown below:

On Title page
Item (73) Assignee

Please change "Forcelo Networks, Inc." to --Force10 Networks, Inc.--

Signed and Sealed this

Fourteenth Day of November, 2006

JON W. DUDAS
*Director of the United States Patent and Trademark Office*